United States Patent
Carlson et al.

(10) Patent No.: US 7,856,341 B2
(45) Date of Patent: Dec. 21, 2010

(54) HEAT SINK

(75) Inventors: Brian L. Carlson, Rochester, MN (US); Bruce J. Chamberlin, Vestal, NY (US); Mark K. Hoffmeyer, Rochester, MN (US); Ahmad D. Katnani, Poughkeepsie, NY (US); Matthew S. Kelly, Ontario (CA); Gregory S. Killinger, Rochester, MN (US); Eric V. Kline, Rochester, MN (US); Wayne J. Rothschild, Rochester, MN (US); Jeffrey A. Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/033,200

(22) Filed: Feb. 19, 2008

(65) Prior Publication Data

US 2009/0210190 A1    Aug. 20, 2009

(51) Int. Cl.
*G06F 11/30* (2006.01)
(52) U.S. Cl. .................. 702/185; 702/130; 374/163; 374/166; 165/58; 165/104.11
(58) Field of Classification Search .............. 165/58, 165/104.11; 702/130, 185
See application file for complete search history.

(56) References Cited

U.S. PATENT DOCUMENTS

| 5,483,102 | A | * | 1/1996 | Neal et al. ............... 257/712 |
|---|---|---|---|---|
| 6,134,667 | A | | 10/2000 | Suzuki et al. |
| 6,191,546 | B1 | | 2/2001 | Bausch et al. |
| 6,225,911 | B1 | * | 5/2001 | Nagamasa et al. .......... 340/635 |
| 6,238,086 | B1 | | 5/2001 | Mikubo et al. |
| 6,491,426 | B1 | | 12/2002 | Schonath et al. |
| 6,792,550 | B2 | | 9/2004 | Osecky et al. |
| 6,928,380 | B2 | | 8/2005 | Chey et al. |
| 7,346,468 | B2 | * | 3/2008 | Bashor et al. ............... 702/136 |
| 2006/0021358 | A1 | * | 2/2006 | Nallapa ...................... 62/126 |

* cited by examiner

*Primary Examiner*—Mohamed Charioui
*Assistant Examiner*—Elias Desta
(74) *Attorney, Agent, or Firm*—Patrick J. Daugherty; Driggs, Hogg, Daugherty & Del Zoppo Co., LPA

(57) ABSTRACT

Sensors are located on first and second regions of a heat sink, with a portion of the heat sink interposed between the first and second region sensors. The heat sink is connected to a component by an attachment that conducts heat from the component to the heat sink, and a third sensor is located on the component or the attachment with a portion of the attachment disposed between the third sensor and the first and second heat sink region sensors. Temperature readings from the sensors are compared to identify a failing one of the heat sink, the attachment portion, and the component with respect to heat conduction, which includes identifying the interposed heat sink portion as failing in response to a divergence between temperature inputs from the first and second heat sink region sensors. Rate-of-rise temperature readings may also be observed and compared, including to historical values.

23 Claims, 2 Drawing Sheets

HEAT SINK

FIELD OF THE INVENTION

The present invention relates to electrical and mechanical component heat dissipation.

BACKGROUND OF THE INVENTION

Some electrical and mechanical system components generate heat while operating, for example amplifier elements, individual semiconductor chips and multi-chip modules and circuit boards. In order to prevent overheating or other damage to the components, and to maintain or improve component and system performance, it is desirable to actively remove the generated heat, and this is commonly accomplished through heat sink methods and articles. A heat sink is an element located within a physical proximity or attached to a heat-generating component and configured to draw or conduct operational heat away from the heat-generating component or vicinity thereof. The operational heat may then be dissipated or otherwise removed, and in some examples a heat engine structure may receive and convert generated thermal energy into mechanical output.

Problems arise due to heat sink component or system inefficiencies and failures. When a heat sink failure is not recognized or abated promptly, un-dissipated operational heat may cause a component to overheat, which may result in damage to the component or performance degradation of a system utilizing the component. It is known to monitor component heat levels in order to recognize a heat sink failure; however, prior art methods and systems typically accomplish this by merely monitoring the heat-generating component for temperatures rising near or above an upper temperature threshold limit. This may be unsatisfactory in timely avoiding damage to the heat-generating component or system performance degradation, each of which may occur before the threshold is reached or prior to temperature reduction through responsive abatement steps.

Thus, there is a need for improved heat sink methods and processes to address the above problems, as well as others.

SUMMARY OF THE INVENTION

In general, the present invention provides methods, system, and program products for heat dissipation. In one aspect, a system is provided wherein an attachment means connects a heat sink to a system component, whereby heat is conducted to the heat sink from the component. A temperature sensor is located on the heat sink and another on the component or the attachment means, wherein a portion of the attachment means is disposed between the sensors. A processor apparatus in circuit communication with the sensors is configured to use the logic to compare temperature readings from the sensors and identify a failure to conduct heat by at least one of the heat sink, the attachment means portion and the component.

In another aspect, the logic processor is further configured to identify a corrective action to be taken to abate the potential heat sink failure. A self-power means may also be provided to supply operative power to the processor. A wireless output circuit may be disposed upon the heat sink in communication with the processor apparatus and configured to transmit processor apparatus outputs to a wireless receiver. The heat sink, component, attachment means, sensors, processor apparatus, self-power means and wireless output circuit may also define a unitary heat sink assembly. In one example, the self-power means is a solid state thermoelectric power generator configured to generate power from a temperature gradient.

In another example, multiple heat sink sensors are provided, each in different heat sink regions, and the logic processor compares the heat sink sensor temperature inputs to divergences and thereby heat sink region failures. In some embodiments, the heat sink comprises a plurality of metal cooling fins configured to radiate heat to a convection medium, with different fins comprising different heat sink regions, and the logic processor may identify a cooling fin air-flow blockage in response to a cooling fin temperature sensor input divergence. Further, the heat sink may have a metal base plate, wherein the attachment means portion is a thermally conductive adhesive disposed upon the base plate planar between a plate sensor and a component top surface sensor. In another example, the logic processor compares rate-of-rise temperature readings from a sensor to a historical failure profile stored in the memory and determines a heat sink failure from a profile correlation.

In another aspect, a method is provided, comprising comparing first and second sensor temperature inputs. The first sensor is located on a heat sink thermally connected to a system component by an attachment means, wherein operating heat from the component is conducted into the heat sink via connective operation of the attachment means, and the second thermal sensor is located on the component or the attachment means, wherein a portion of the attachment means is disposed between the first sensor and second sensors. In response to the step of the comparing, a failure to conduct heat by at least one of the heat sink, the attachment portion and the component is determined and, in response to said determination, a failing one of the heat sink, the attachment means portion and the component is identified.

Methods are also provided for producing computer executable program code, storing the produced program code on a computer readable medium, and providing the program code to be deployed to and executed on a computer system, for example by a service provider who offers to implement, deploy, and/or perform at least some of said method steps described above for others. Still further, an article of manufacture comprising a computer usable medium having the computer readable program embodied in said medium may be provided, the program code comprising instructions which, when executed on the computer system, cause the computer system to perform at least some of said method steps.

In some methods, a corrective action is suggested in response to the failure determination. And in other methods, the step of comparing further comprises comparing a first or second sensor temperature input value or a comparison value to a historic temperature value. In some methods, a historic temperature value is varied in response to the step of comparing, determining or identifying. And in other methods, a stress test is applied, stress test temperature inputs are compared to a historic stress test comparison value, and an assembly of the heat sink, the attachment means portion and the component is qualified in response to the stress test comparison.

BRIEF DESCRIPTION OF THE DRAWINGS

These and other features of this invention will be more readily understood from the following detailed description of the various aspects of the invention taken in conjunction with the accompanying drawings in which.

Figure 1:
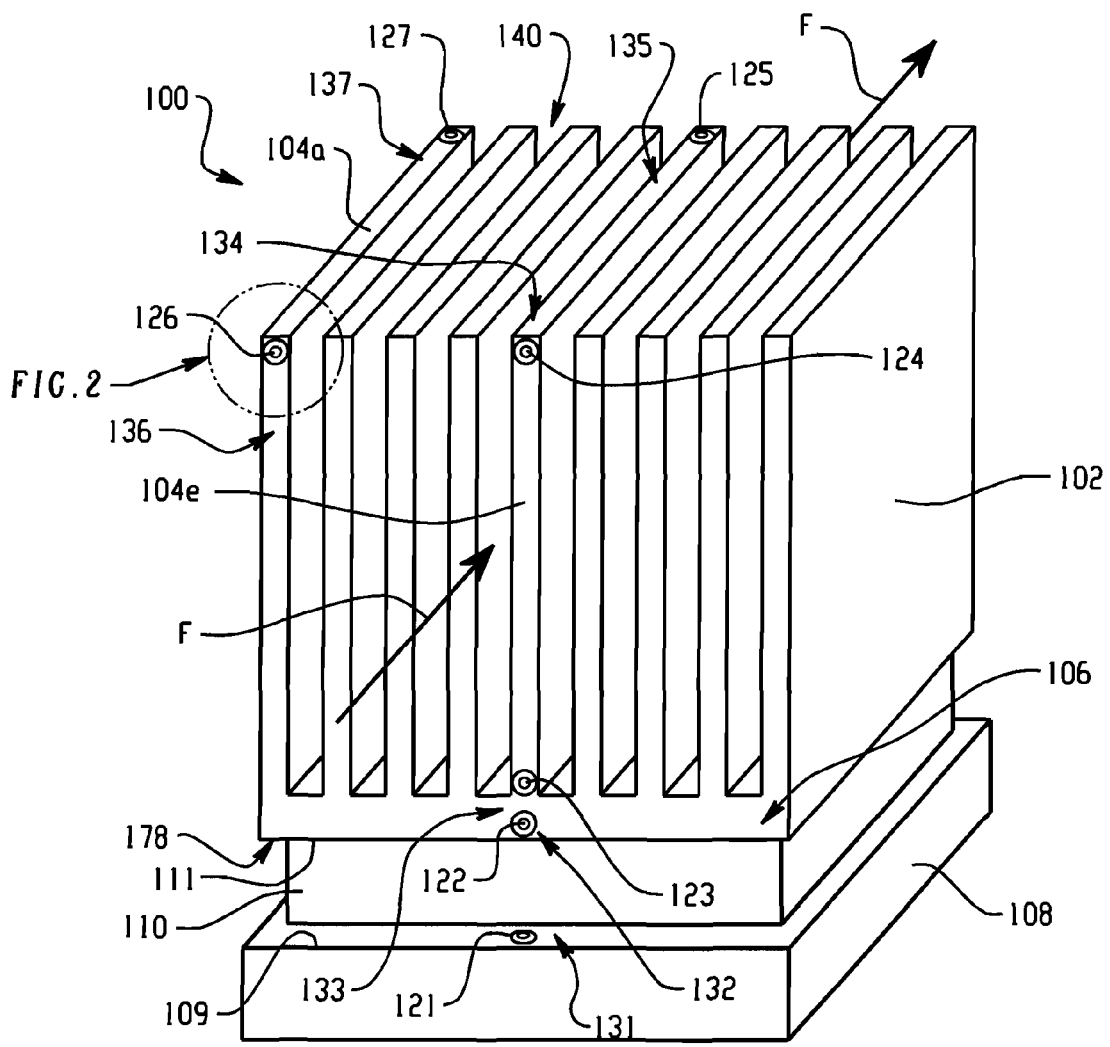
FIG. 1 is a perspective illustration of a heat sink assembly according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation I. General Description FIG. 1 illustrates one embodiment of a heat sink assembly 100 according to the present invention. An air-cooled metallic heat sink 102, typically aluminum or copper, has a plurality of cooling fins 104 projecting vertically upward and generally parallel to each other from a base plate 106. The base plate 106 is attached to a heat-generating computer system component 108 through a thermally conductive Thermal Interface Material (TIM) attachment means 110. In the present embodiment the attachment means 110 is a thermal epoxy, though other adhesive means may be practiced; for example, in another embodiment the attachment means 110 is a direct mechanical means 110 such as a spring/clip assembly (not shown). The component 108 in the present example is a microprocessor chip 108, though the component 108 may be any heat generating component, illustratively but not exhaustively including amplifier element, multi-chip module, chip or chip module cap, and circuit board examples.

Chip 108 operational heat is conducted upwards through the TIM 110 into the base plate 106 and the cooling fins 104. Cooling is achieved by free or forced air convection with an air stream F flowing through gap regions 140 between adjacent cooling fins 104, for example by a forced air means such as a fan (not shown). The cooling fins 104 radiate conducted operational heat outward and into the air flow stream F, the air flow F carrying the operational heat away from the cooling fins 104 and the heat sink assembly 100.

A plurality of temperature sensors 121-127 are provided at various locations of each of the heat sink assembly 100 components 102, 110 and 108, each selected as appropriate to a specified location and expected temperature range functionality. Thus, a sensor 121 is located on a top surface or region 131 of the chip 108 and detects a temperature T1 of the heat source chip 108 at its interface to the TIM 110. Temperature sensor 122 is located at the heat sink base 106, preferably on or near a base bottom surface area 132 in order to detect a heat sink base temperature T2 adjacent to the chip 108. Sensor 123 detects a temperature T3 at a front base region 133 near the top of the heat sink base 106 and at the bottom of cooling fin 104e. And sensors 124-127 are illustrated at cooling fin 104 top areas: sensor 124 located at a front top region 134 of cooling fin 104e detects a temperature T4; sensor 125 located at a rear top region 135 of cooling fin 104e detects a temperature T5; sensor 126 located at a front top region 136 of cooling fin 104a detects a temperature T6; and sensor 127 located at a rear top region 137 of cooling fin 104a detects a temperature T7. In the present embodiment, the temperature sensors 121-127 are thermistors, though other temperature sensors 121-127 may be practiced with the present invention.

Mechanical attachment means may be used to bring a sensor 121-127 into contact with a desired component 102/110/108 surface. For example, a top end of a spring or elastomer element (not shown) may be attached to the heat sink base 106 bottom surface and the sensor 121 attached to its bottom end, the spring/elastomer configured to compel the sensor 121 against a chip 108 upper surface. Sensors 121-127 may also be directly attached to a respective 102/110/108 surface by a thermally conductive adhesive means such as a thermal epoxy, which enables structural temperature readings T1-T7 to be obtained directly for a respective structural region 131-137 by conduction through the adhesive means.

Figure 2:
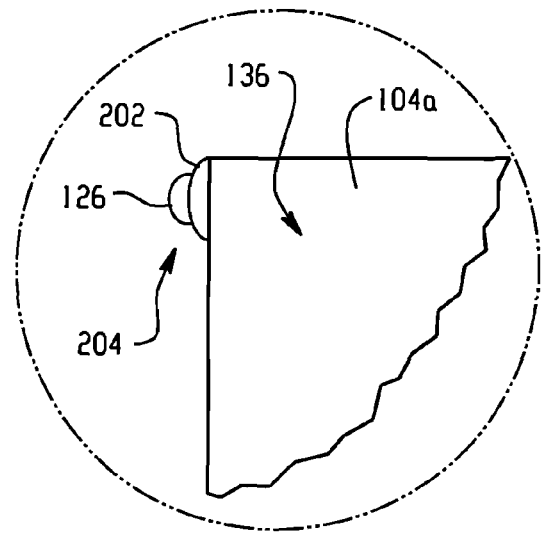
FIG. 2 is a detail view of a portion of the heat sink assembly of FIG. 1.

Any of the sensors 121-127 may also be structurally formed or incorporated within any one of the respective heat sink assembly 100 components 102/110/108, which may provide efficiency advantages by reducing attachment means material and structural configuration requirements, and also thereby proportionately reducing material failure possibilities. For example, FIG. 2 provides a detail view of the front upper area 136 of the cooling fin 104a illustrating an example wherein the sensor 126 is attached to the cooling fin 104a by a non-thermally conductive or thermally insulating attachment means 202, which enables the sensor 126 to more accurately measure an ambient air temperature of the incoming air flow F in a region 204 near and about the cooling fin 104a by preventing operating heat in the fin 104 from being conducted into the sensor 126.

Figure 3:
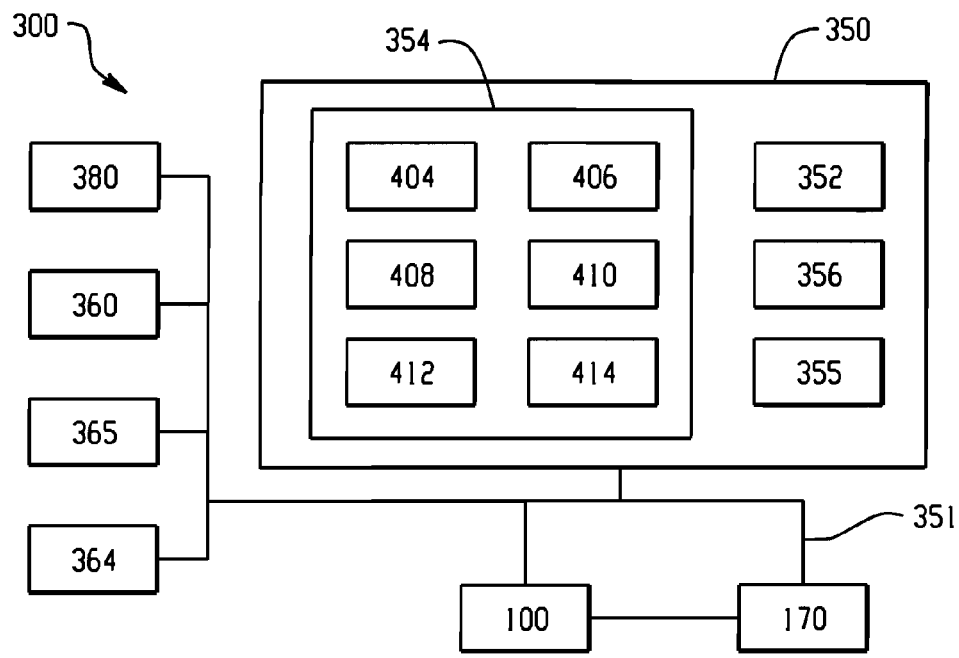
FIG. 3 is a schematic illustration of a heat sink assembly in circuit communication with an operating system according to the present invention.

FIG. 3 is a schematic illustration of a computer system 300 incorporating the heat sink assembly 100, wherein chip 108 is in circuit communication with an operating system 170 and a processing apparatus 350 is in circuit communication 351 with the heat sink assembly sensors 121-127. The processing apparatus 350 comprises a computer-readable means 354 containing logic used by a processor 352 to receive and process the observed temperatures T1-T7 and make determinations as to heat sink assembly 108/110/102 performance(s). Individual discrete temperature observations T1-T7 by each respective temperature sensor 121-127 are thus used by the logic processor 352 to monitor individual thermal performances of each of the respective locations 131-137.

Figure 4:
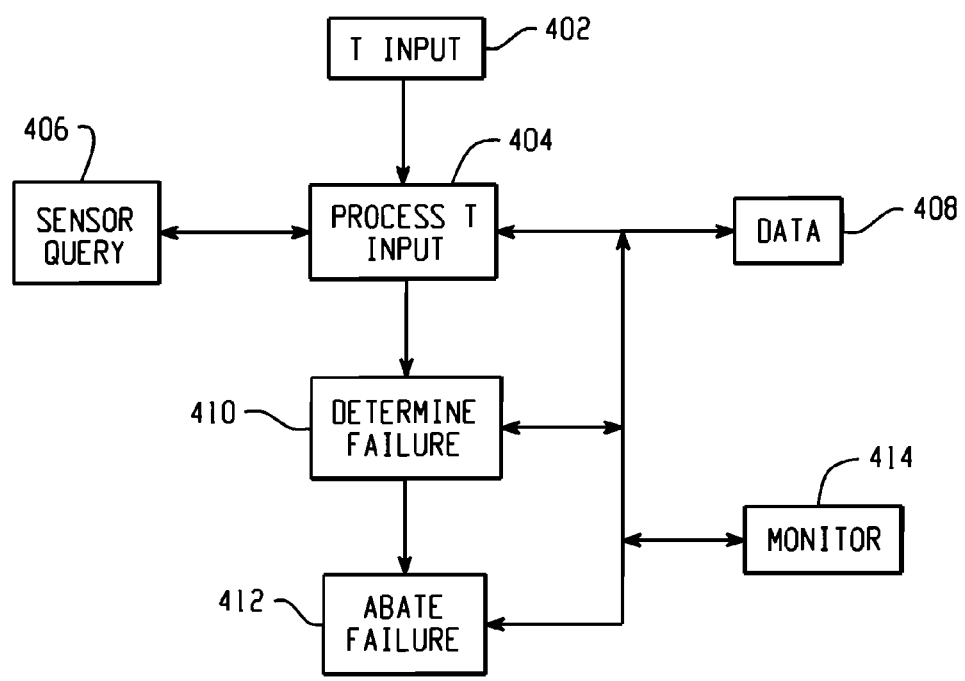
FIG. 4 is a process according to the present invention.

FIG. 4 illustrates a process according to the present invention. At 402 at least one temperature input T1-T7 is received by the logic processor 352 through the communication means 351. At 404 the logic processor 352 uses logic provided by the computer-readable means 354 to process the at least one temperature input T1-T7. Processing of the at least one temperature input T1-T7 may include an input of one or more additional temperature inputs T1-T7 from one or more respective sensors 121-127, including by an active query for additional temperatures inputs T1-T7 at 406, and also input of additional data at 408. The additional data is retrieved from the computer-readable means 354 and may include historic temperature inputs T1-T7 as well as parameters associated with one or more of the temperatures T1-T7 including threshold temperatures. The parameters may be fixed, or they may be dynamically set and variable: in one example the parameters may be set or varied by the logic processor 352 in a previous process step 404. A user or computer system 370, service provider 360 or external manager 380 may also provide, set or vary the parameters provided with the data at 408.

The logic processor thus determines if a failure event is occurring or developing, or predicts a future failure, at 404. In some embodiments, the logic processor 352 also further determines a cause of the event at 410, and also optionally directly takes steps to abate the failure at 412. Processing at 404 further results in data output to the data means 354 at 408, to create or revise historical data used for subsequent temperature input processing at 404. By locating a plurality of sensors to take temperature readings from more than one of the heat sink 102, TIM 110 and chip 108 components and processing temperatures inputs T1-T7 with the logic processor 352 the present invention provides for robust and detailed heat sink assembly 100 performance and failure determinations.

Accordingly, in one example, the logic processor 352 may use temperature T1 detected by sensor 121 as representative of the chip 108 operating temperature (or the discrete region or portion 131 thereof), or of a junction temperature at the interface 109 between the chip 108 and the TIM 110 (particularly when sensor 121 is located on a top chip surface 131). Temperature T1 may then provide temperature inputs used to determine over-heating and heat sink failure events by a comparison at 404 to a historic T1 or a threshold T1-Max from the data provided at 408, and thus independent of any other sensor T2-T7 inputs.

The temperatures T1-T7 may also be compared to one or more of each other, thereby defining paths for determining the thermal behavior of one or more intervening components or regions thereof. For example, the thermal conduction performance of the TIM 110 may be determined at 404 by comparing T1 to the heat sink base bottom surface/area temperature T2. In one aspect, if T1 exceeds T2 by more than a historic or threshold value, then an impeded thermal conduction of operating heat into the heat sink base 106a through the TIM is indicated, indicating a likelihood of mechanical failure of the TIM 110 or interface 109/111 therewith. T3 and T2 may be compared to determine a vertical thermal conduction performance of the heat sink base 106 from the base bottom surface/area 132 to the heat sink base top region 133; again, an unexpected divergence may indicate a mechanical failure of a portion of the heat sink 102. A vertical thermal conduction performance of the cooling fin 104e may be determined by comparing T3 and T4. And a multi-component 102/110/108 heat sink assembly 100 performance (or regions thereof, for example including regions 131 and 137) may be determined and/or monitored by comparing T1 to T7.

Additionally, by providing multiple sensors in one component or across a region of one component further detailed individual component thermal performances may be determined by the logic processor 352, and thereby further detailed heat sink failure information. For example, the present embodiment provides for four sensors 124-127 located at four different respective upper cooling fin regions 134-137. An observed temperature T7 diverging from an expected T7 value may indicate a heat sink system failure at the cooling fin 104a top rear area 137. A divergence observed between T7 and one or more of the other cooling fin top region temperatures T4-T6 may indicate a blockage of air flow F across the cooling fin 104a top rear area 137, such as by dust or dirt within a gap region 140. And an incoming air temperature T6 reported by sensor 126 may be used by the logic processor 352 to determine if higher-than-expected temperatures T4, T5 or T7 reported by sensors 124, 125 or 127, respectively, are due to high incoming ambient air temperatures or due instead to a heat sink assembly 100 problem. Additional data inputs at 408 from other sensors (not shown), the service provider 360, monitoring system 380, computer system 370 or a computer user may also be used, including an air flow F rate or system activity level observation. Where multiple sensors 121 or 123 are located in an interface area 109 or 111, respectively, it may be desirable to limit a total number, sensor density or sensor surface area to avoid interference with heat conduction to the heat sink 102 and thereby reduction of assembly 100 cooling efficiency, and also to avoid compromising the mechanical integrity of an interface 109/111.

In another aspect, the use of multiple sensors enables increased sophistication in observing assembly 100 temperature characteristics. Temperature rate-of-rise observations by an individual sensor 121-127 may be compared to other sensor 121-127 observations and used to predict heat sink failures prior to the occurrence of a critical temperature event, and in particular by comparison to known and historical failure profiles defined by sensor 121-127 rate-of-rise profile comparisons. Thus, the processor 352 may be configured to apply one or more algorithms to the temperature T1-T7 inputs, wherein algorithm outputs may indicate an impending or actual assembly 100 heat sink failure and trigger notification or abatement steps in response to an observed T1-T7 rate-of-rise.

Processing outputs are also provided to an external monitoring component 380 or a service provider 360 at 414. By continuously monitoring logic processor 352 outputs for indications of heat sink assembly 100 failure, the present invention enables corrective action prior to systems failure, in contrast to prior art systems that provide only limited temperature measurements and no data processing and determine a cooling fault only when a component reaches a temperature threshold limit. Thus, the present invention enables prediction of a fault before damage or shut down occurs, along with providing a determination at 410 of a component or region-specific cause of the failure. The present invention also thus enables another entity (such as a computer user, a service provider 360, external monitor component 380 or the operating computer system 370) to actively perform an abatement step at 412. In one example, a service provider 360 in communication with the logic processor 352 monitors the heat sink assembly 100 and alerts a user or the computer system 370 to a problem (for example, a blocked air channel 140 between adjacent cooling fins 104 or a loose heat sink 102, etc., as determined by the logic processor 352), wherein the user, service provider 360 or computer system 370 takes steps at 412 to abate the problem (for example by increasing one or more fan speeds or decreasing chip 108 heat generation by slowing a chip 108 clock speed).

System power may be provided to the processor apparatus 350 by a self-power means 362, thus enabling the processor apparatus 350 to function independently of an associated computer system 370 power status. Self-power means 362 examples include a long life battery 362 and a solid state thermoelectric heat engine power generator which generates power in response to a heat sink assembly 100 temperature gradient, though other self-power means 362 may be practiced. And in one aspect, one or more or all of the sensors 121-127, self-power means 362, processor apparatus 350 and communications link 351 may be entirely contained within the heat sink assembly 100, providing a novel self-contained heat sink performance monitoring structure and system.

Communication circuitry 351 may be wired or wireless circuitry. In one aspect, Radio Frequency (RF) communication circuitry 351 may be enabled by a planar heat sink bottom surface 178 which functions as a capacitive coupled-interface to a chip carrier 108. An RF communication circuitry 351 signal may also be configured to conform to one or more industry standards, such as Bluetooth©, thereby further enabling direct communication with the computer system 370 or an external service provider 360 or other central monitoring system 380, or indirectly through communication to a wireless node (not shown) that may then relay communications to the computer system 370, service provider 360 or central monitoring system 380, as will be appreciated by one skilled in the art.

The present invention may also be adapted to provide stress testing to heat sink assemblies. In one example, a stress test may be applied to the computer system 370 and/or to the chip 108, wherein one or more of the sensors 121-127 are used to provide cooling performance temperature outputs T1-T7 used by the processing apparatus 350 to qualify the heat sink assembly 100. Thus, one advantage of the present invention is improved efficiencies by eliminating the need for separate post-test failure analysis procedures.

Application of the present invention is not limited to the forced air-metal cooling fin heat sink assembly 100 discussed thus far. For example, a diamond spreader structure (not shown) may be used as a heat sink with the chip 108. Diamond spreaders are efficient heat conductors which rapidly conduct heat, wherein in operation temperatures throughout the entire spreader remain essentially equalized. Moreover, in some applications a diamond spreader is configured to conduct heat laterally as well as vertically away from a heat-generating chip 108 or area thereof. Thus, spreader or spreader/chip 108 assembly structural failures (such as, for example, a crack in the spreader) may be detected by observing divergent temperature readings between any two sensors located on the diamond spreader. Other heat sink examples include water-cooling heat sink components, phase-change technology heat sinks that incorporate heat pipe or vapor chambers, and solid state heat dissipation systems. Thus, in another example, the flow F illustrated in FIG. 1 may be a water or other liquid product flow, and the cooling fins 104 structured to radiate heat into the fluid flow F. In another alternative heat-pipe heat sink assembly (not shown), a plurality of temperature sensors may be arranged and configured to take temperature measurements of heat sink vapor, condensate, and/or wick material or capillary structures, in order to enable the logic processor 352 to determine a heat pipe efficiency and/or detect problems with a heat-pipe container elements, fluid, or wicks. Other configurations will be readily apparent to one skilled in the art.

II. Computerized Implementation

FIG. 3 provides an illustration of an exemplary computerized implementation of a processing apparatus 350 deployed within a computer infrastructure 370 as described above. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links 351. For example, the communication links 351 can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure illustrated in FIG. 1 is intended to demonstrate that some or all of the components of implementation could be deployed, managed, serviced, etc. by a service provider 360 who offers to implement, deploy, and/or perform the functions of the present invention for others.

As shown, the processing apparatus 350 includes the logic processor 352, the computer-readable memory means 354, a bus 355, and input/output (I/O) interfaces 356. Further, the processing apparatus 350 is shown in communication with external I/o devices/resources 364 and storage system 365. In general, the logic processor 352 executes computer program code, such as the code to implement the steps illustrated in FIG. 4, which is stored in the memory 354 and/or storage system 365. It is also to be appreciated that two or more, including all, of these components may be implemented as a single component.

While executing computer program code, the logic processor 352 can read and/or write data to/from the memory 354, the storage system 365, and/or the I/O interfaces 424. The bus 355 provides a communication link between each of the components in the processing apparatus 350. The external devices 364 can comprise any devices (e.g., keyboard, pointing device, display, etc.) that enable a user to interact with the processing apparatus 350, operating system 370 and/or any devices (e.g., network card, modem, etc.) that enable the processing apparatus 350 to communicate with one or more other computing devices.

The processing apparatus 350 is only illustrative of various types of computer infrastructures for implementing the invention. For example, in one embodiment, the processing apparatus 350 comprises two or more computing devices (e.g., a server cluster) that communicate over a network to perform the various process steps of the invention. Moreover, processing apparatus 350 is only representative of various possible computer systems that can include numerous combinations of hardware.

To this extent, in other embodiments, the processing apparatus 350 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing apparatus 350 may comprise a single processing unit, or be distributed across one or more processing units in one or more locations, e.g., on a client and server. Similarly, the memory 354 and/or the storage system 365 can comprise any combination of various types of data storage and/or transmission media that reside at one or more physical locations.

Further, I/O interfaces 364 can comprise any system for exchanging information with one or more external device. Still further, it is understood that one or more additional components (e.g., system software, math co-processing unit, etc.) not shown in FIG. 3 can be included in the processing apparatus 350. However, if the processing apparatus 350 comprises a handheld device or the like, it is understood that one or more of the external devices 364 (e.g., a display) and/or the storage system 365 could be contained within the processing apparatus 350, not externally as shown.

The storage system 365 can be any type of system (e.g., a database) capable of providing storage for information under the present invention. To this extent, the storage system 365 could include one or more storage devices, such as a magnetic disk drive or an optical disk drive. In another embodiment, the storage system 365 includes data distributed across, for example, a local area network (LAN), wide area network (WAN) or a storage area network (SAN) (not shown). In addition, although not shown, additional components, such as cache memory, communication systems, system software, etc., may be incorporated into the processing apparatus 350.

Also shown in the memory 354 of the processing apparatus 350 are logic temperature processor 404, temperature query 406, data provider 408, failure determiner 410, failure abater 412 and heat sink monitor 414 components that perform the functions discussed above. Specifically, the temperature processor 404, temperature query 406, data provider 408 and failure determiner 410 will work in cooperation to process heat sink assembly 100 temperatures T1-T7 and historical and other data inputs from memory 354 and/or memory system 365 to determine one or more heat sink assembly 100 failures or potential failures. These components will also work together to periodically update the data stored in memory 354 and/or memory system 365 and provided by the data provider 408. In response to a failure or potential failure determination the logic failure abater 412 may actively abate the determined failure or potential failure, and the monitor 414 may notify a user, service provider 360 or other monitoring system 380 of the failure, the notice possibly including a recommended abatement step.

While shown and described herein as a heat sink method and system, it is understood that the invention further provides various alternative embodiments. For example, in one embodiment, the invention provides a computer-readable/useable medium that includes computer program code to enable a computer infrastructure to determine actual or potential heat sink failures, abate actual or potential heat sink failures, and/or monitor actual or potential heat sink failures. To this extent, the computer-readable/useable medium includes program code that implements each of the various process steps of the invention, including more specifically as discussed above.

It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 354 and/or the storage system 365 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to determine actual or potential heat sink failures, abate actual or potential heat sink failures, and/or monitor actual or potential heat sink failures, including more specifically as discussed above. In this case, the service provider can create, maintain, and support, etc., a computer infrastructure, such as the processing apparatus 150 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the processes of determining actual or potential heat sink failures, abating actual or potential heat sink failures, and/or monitoring actual or potential heat sink failures, including more specifically as discussed above. In this case, a computer infrastructure, such as the computer infrastructure 300 illustrated and discussed above, can be provided and one or more systems for performing the process steps of the invention can be obtained (e.g., created, purchased, used, modified, etc.) and deployed to the computer infrastructure 300. To this extent, the deployment of a system can comprise one or more of: (1) installing program code on a computing device, such as the processing apparatus 350, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A system, comprising:
a processor apparatus in circuit communication with a first heat sink region sensor located on a first region of a heat sink, a second heat sink region sensor located on a second region of the heat sink wherein a heat sink portion is interposed between the first heat sink region and the second heat sink region, wherein the heat sink is connected to a component by an attachment means to conduct heat from the component to the heat sink, and with a third sensor located on the component or the attachment means, wherein a portion of the attachment means is disposed between the third sensor and the first and second heat sink region sensors, the processor apparatus comprising a logic processor and a memory means, the memory means comprising logic, wherein the logic processor uses the logic to compare temperature inputs from the first heat sink region sensor, the second heat sink region sensor and the third sensor to determine a failure to conduct heat to the heat sink by at least one of the heat sink portion, the attachment means portion and the component, and to identify the heat sink portion as the failing element in response to a divergence between the first heat sink region sensor temperature input and the second heat sink region sensor temperature input.

2. The system of claim 1, wherein the logic processor is further configured to identify a corrective action to be taken to abate the potential heat sink failure.

3. The system of claim 2 further comprising a self-power means in circuit communication with and configured to provide operative power to the processor apparatus.

4. The system of claim 3 further comprising a wireless output circuit in communication with the processor apparatus and disposed upon the heat sink base plate, the wireless output circuit configured to transmit processor apparatus outputs to a wireless receiver.

5. The system of claim 4, wherein the heat sink, the component, the attachment means, the first heat sink region and second heat sink region and third sensors, the processor apparatus, the self-power means and the wireless output circuit define a unitary heat sink assembly.

6. The system of claim 5 wherein the self-power means is a solid state thermoelectric power generator configured to generate power from a heat sink assembly temperature gradient.

7. The system of claim 1, wherein the heat sink comprises a plurality of cooling fins configured to radiate heat to a convection medium, and the first heat sink region is a first cooling fin and the second heat sink region is a second cooling fin;

and wherein the logic processor is further configured to use the logic to identify a convection medium blockage in response to the temperature divergence.

8. The system of claim 7, wherein the heat sink has a metal base plate having a planar bottom surface, the plurality of cooling fins arrayed upward from the base plate;

wherein the processor apparatus is in circuit communication with a base plate sensor attached to the base plate planar bottom surface;

wherein the third sensor is attached to a component top surface;

wherein the attachment means portion is a thermally conductive adhesive having a top surface disposed upon the base plate planar bottom surface and a bottom surface disposed upon the heat-generating component top surface; and wherein the logic processor uses the logic to compare temperature inputs from the base plate sensor and the third sensor to identify the attachment means portion as the failing element in response to a divergence between the base plate sensor temperature input and the third sensor temperature input.

9. The system of claim 1, wherein the logic processor uses the logic to compare rate-of-rise temperature readings from the first heat sink region sensor, the second heat sink region sensor and the third sensor to a historical profile stored in the memory and determine the failure to conduct heat from a correlation of the rate-of-rise comparison to the historical failure profile.

10. A method for monitoring heat sink behavior, comprising the steps of:

comparing a first sensor temperature input from a first heat sink region sensor on a first region of a heat sink to a second sensor temperature input from a second region sensor located on a second region of the heat sink, wherein a heat sink portion is interposed between the first and second heat sink regions, and to a third sensor temperature input from a third thermal sensor on a system component or an attachment means, wherein the heat sink is thermally connected to the system component by the attachment means so that operating heat from the component is conducted into the heat sink via connective operation of the attachment means, and wherein a portion of the attachment means is disposed between the third sensor and the first heat sink region and second heat sink region sensors;

in response to the step of the comparing, determining a failure to conduct heat to the heat sink by at least one of the heat sink portion, the attachment means portion and the component; and in response to the step of the determining, identifying the failing one of the heat sink, the attachment means portion and the component, including by identifying the heat sink portion as the failing element in response to a divergence between a value of the first heat sink region sensor temperature input and a value of the second heat sink region sensor temperature input.

11. The method of claim 10, further comprising the step of, in response to the step of determining, suggesting a corrective action.

12. The method of claim 11, wherein the step of comparing further comprises comparing the first heat sink region sensor temperature input value or the second heat sink region sensor temperature input value or a temperature input value from the third sensor to a historic temperature value.

13. The method of claim 12, further comprising the step of varying the historic temperature value in response to the step of comparing, determining or identifying.

14. The method of claim 12, further comprising the steps of:

applying a stress test to the component;

comparing a stress test temperature input from at least one of the first heat sink region sensor to a stress test temperature input from and the third sensor and to at least one historic stress test comparison value; and qualifying an assembly of the heat sink, the attachment means portion and the component in response to the comparison to the at least one historic stress test comparison value.

15. The method of claim 10, wherein the heat sink comprises a plurality of cooling fins configured to radiate heat to a convection medium, and the first heat sink region is a first cooling fin and the second heat sink region is a second cooling fin;

and wherein the step of identifying the heat sink portion as the failing element comprises identifying a convection medium blockage.

16. A non-transitory computer readable storage medium having computer readable program code embodied therewith for causing a computer processor to perform:

compare a first sensor temperature input from a first heat sink region sensor on a first region of a heat sink to a second sensor temperature input from a second region sensor located on a second region of the heat sink, wherein a heat sink portion is interposed between the first and second heat sink regions, and to a third sensor temperature input from a third thermal sensor on a system component or an attachment means, wherein the heat sink is thermally connected to the system component by the attachment means so that operating heat from the component is conducted into the heat sink via connective operation of the attachment means, and wherein a portion of the attachment means is disposed between the third sensor and the first heat sink region and second heat sink region sensors;

determine a failure to conduct heat to the heat sink by at least one of the heat sink portion, the attachment means portion and the component in response to the temperature input comparison; and identify the failing one of the heat sink, the attachment means portion and the component in response to the failure determination, including by identifying the heat sink portion as the failing element in response to a divergence between a value of the first heat sink region sensor temperature input and a value of the second heat sink region sensor temperature input.

17. The non-transitory computer readable storage medium of claim 16, wherein the computer readable program code instructions, when executed by the computer processor, is further configured to cause the computer processor to suggest a corrective action.

18. The non-transitory computer readable storage medium of claim 17, wherein the computer readable program code instructions, when executed by the computer processor, is further configured to cause the computer processor to compare the temperature input from at least one of the first heat sink region sensor and the second heat sink region sensor to the third sensor temperature input, and to responsively suggest the corrective action as a function of a difference of said compared sensor temperature inputs from a historic temperature value.

19. The non-transitory computer readable storage medium of claim 18, wherein the computer readable program code, is further configured to:
apply a stress test to the computer system component;
monitor a stress test performance output from at least one of the first heat sink region, the second heat sink region and the third sensor; and
qualify an assembly of the heat sink, the attachment means portion and the system component in response to a successful indication from the monitored stress test performance output.

20. A method for deploying an application for monitoring heat sink behavior, comprising:
providing a computer with a non-transitory computer readable storage medium having computer readable program code embodied therewith, the program code comprising instructions which, when executed by the computer processor, causes the computer processor to:
compare a first sensor temperature input from a first heat sink region sensor on a first region of a heat sink to a second sensor temperature input from a second region sensor located on a second region of the heat sink, wherein a heat sink portion is interposed between the first and second heat sink regions, and to a third sensor temperature input from a third thermal sensor on a system component or an attachment means, wherein the heat sink is thermally connected to the system component by the attachment means so that operating heat from the component is conducted into the heat sink via connective operation of the attachment means, and wherein a portion of the attachment means is disposed between the third sensor and the first heat sink region and second heat sink region sensors;
determine a failure to conduct heat to the heat sink by at least one of the heat sink portion, the attachment means portion and the component in response to the temperature input comparison: and
identify the failing one of the heat sink, the attachment means portion and the component in response to the failure determination, including by identifying the heat sink portion as the failing element in response to a divergence between a value of the first heat sink region sensor temperature input and a value of the second heat sink region sensor temperature input.

21. The method of claim 20, wherein the program code comprises instructions which, when executed by the computer processor, cause the computer processor to suggest a corrective action.

22. The method of claim 21, wherein the program code comprises instructions which, when executed by the computer processor, cause the computer processor to compare the first heat sink region sensor temperature input value or the second heat sink region sensor temperature input value or a temperature input value from the third sensor to a historic temperature value and to suggest said corrective action in response to the comparison.

23. The method of claim 22, wherein the program code comprises instructions which, when executed by the computer processor, cause the computer processor to:
apply a stress test to the computer system component;
monitor a stress test performance output from at least one of the first heat sink region, the second heat sink region and the third sensor; and
qualify an assembly of the heat sink, the attachment means portion and the system component in response to a successful indication from said monitored stress test performance.

* * * * *